United States Patent [19]

Turner et al.

[11] 4,362,951
[45] Dec. 7, 1982

[54] CYCLE CHARGE STANDBY POWER SYSTEM

[75] Inventors: Charles S. Turner, Dallas; Donald J. McNeal, Garland; Donald G. Cheshier, Garland; James C. Gray, Garland, all of Tex.

[73] Assignee: Control Technology, Dallas, Tex.

[21] Appl. No.: 215,005

[22] Filed: Dec. 10, 1980

[51] Int. Cl.³ .................... H02J 9/06; H02J 7/04
[52] U.S. Cl. .................................... 307/66; 320/21
[58] Field of Search ............... 307/64, 66, 86; 363/41; 320/21, 37, 38

[56] References Cited

U.S. PATENT DOCUMENTS

| | | | |
|---|---|---|---|
| 3,771,012 | 11/1973 | Niederjohn | 307/64 X |
| 3,886,427 | 5/1975 | Long | 320/37 X |
| 3,986,098 | 10/1976 | Tamii | 307/64 X |
| 4,044,268 | 8/1977 | Hammel et al. | 307/66 |
| 4,080,558 | 5/1978 | Sullivan | 307/66 |
| 4,096,394 | 6/1978 | Ullmann | 307/65 X |
| 4,115,704 | 9/1978 | Hannemann et al. | 307/64 |
| 4,121,282 | 10/1978 | Ohsawa | 363/41 |
| 4,122,359 | 10/1978 | Breikss | 307/64 |
| 4,166,247 | 8/1979 | Miyazawa | 363/41 X |
| 4,223,232 | 9/1980 | Bulat | 307/66 |
| 4,225,792 | 9/1980 | Fahey | 307/66 |
| 4,241,261 | 12/1980 | Ebert, Jr. | 307/64 X |
| 4,245,290 | 1/1981 | Lipmn | 363/41 |
| 4,262,212 | 4/1981 | Jacob et al. | 307/65 X |

*Primary Examiner*—G. Z. Rubinson
*Assistant Examiner*—James L. Dywer
*Attorney, Agent, or Firm*—Thomas L. Cantrell; Joseph H. Schley

[57] ABSTRACT

Disclosed is a standby power supply system appropriate to supply a set of signal amplifiers within a cable television network. The standby power supply normally operates off of utility company power and alternatively operates from a battery power supply during power failures. Circuitry is disclosed to use battery power during failure mode operation to generate a pulse width modulated alternating current of substantially constant true rms voltage and of substantially constant frequency. Circuitry is also disclosed to cycle charge the battery supply to a desired voltage and then stop the charging cycle and begin timing normal mode operation until another charging cycle. Further, isolating circuitry is disclosed to remove much of the load on the battery supply during normal mode operation. Various safety provisions including soft start provisions, a high current cut off, a low voltage cut off, and protection for the amplification stages is included. Finally, various types of status monitoring equipment are disclosed.

17 Claims, 4 Drawing Figures

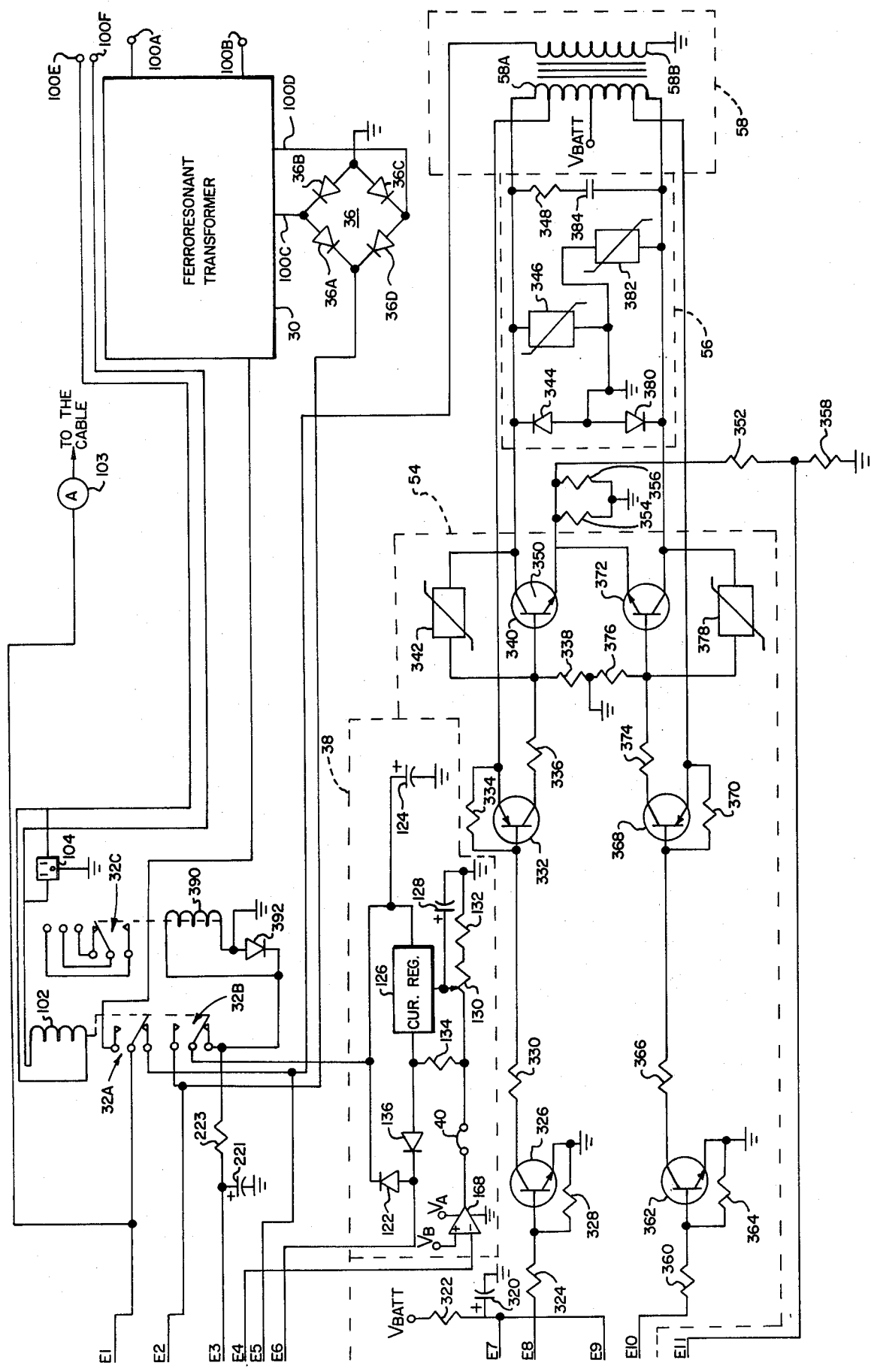

CYCLE CHARGE STANDBY POWER SYSTEM

BACKGROUND

Cable television systems utilize centralized receiving antennae and transmitting stations in conjunction with networks of cable lines to provide extended television service. However the economics of such systems require a network system that is far too extensive to allow a limited voltage signal to reach the last users on the cables and for this reason signal transmission requires intermittent amplification along the cable. This amplification requires a power input and ordinarily the requisite power is bought from the local utility company, is stepped down and transmitted to a number of amplifiers up and down the cable. However, without special provisions, a system of this configuration produces a cable network that fails for all users beyond any given power failure that affects one set of amplifiers. Such failures create particularly bad customer relations with the subscribers whose home and television set are powered but who are receiving no signal because of a distant power failure.

Various battery operated standby power systems have been developed that both power the amplifiers and continuously charge the standby batteries with power from the utility company's lines and, during power failures, switches to battery power for signal amplification.

Among the important parameters for a standby power system in this environment are the life of the batteries, the duration of standby operation, the wave form generated, the reliability of the system, and the safety precautions to protect the standby power system and associated amplifiers.

SUMMARY OF THE INVENTION

The standby power supply of the present invention transmits the power to the cable directly through the input transformer in the normal operating mode as used when the utility company power is available. This same normal mode operation is used to periodically charge the standby batteries. This cycle charging feature promotes long battery life by charging up to an appropriate voltage only after predetermined intervals. Further, provisions are included to substantially isolate the batteries from major loads associated with failure mode operation when the supply is actually operating in the normal mode. Another aspect of the cycling feature of the present invention is the direct set circuitry which is triggered by operation in the failure mode and which immediately initiates a charging cycle upon the restoration of utility company power.

The batteries provide the power supply for efficiently generating a square wave compatible with currently used conventional amplifiers. Further, the waveform generated is pulse width modulated to maintain a substantially constant voltage (true rms) to the amplifiers despite the drain upon the batteries, the corresponding drop in battery voltage, and the presence of varing loads. Finally, various safety features have been incorporated to both ensure reliable operation and to prevent damage to the power supply and associated signal amplifiers.

A BRIEF DESCRIPTION OF THE DRAWINGS

FIG. 4 compliments FIG. 3 as the remainder of the circuit diagram of a standby power supply constructed in accordance with the present invention.

DETAILED DESCRIPTION

Environment

Figure 1:
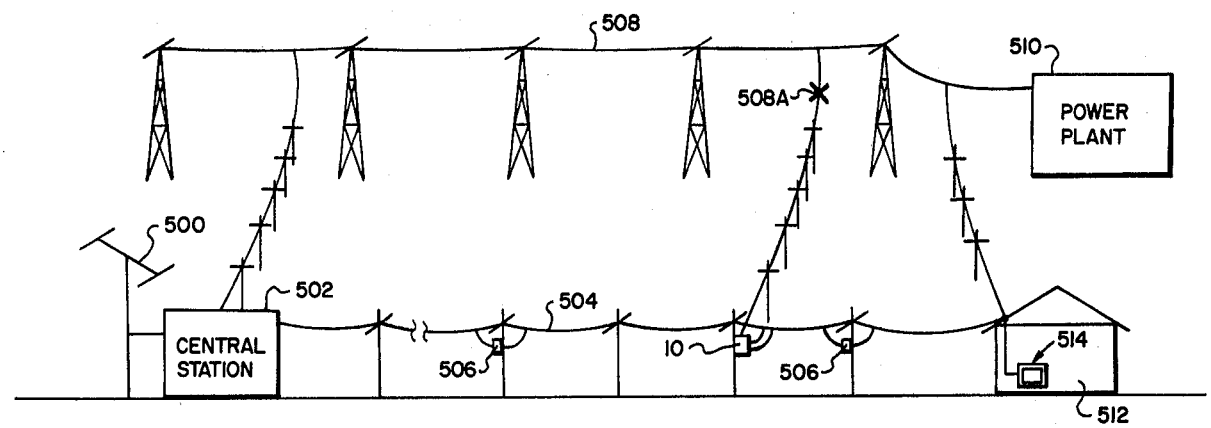
FIG. 1 is a schematic of a television cable network and illustrates the relative placement of a cycle charge standby power supply constructed in accordance with the present invention.

FIG. 1 is a schematic illustration of a standby power supply in place within a television cable network. The signal is received through antenna 500 or is otherwise relayed to or generated at central station 502 and is transmitted over cable 504. Spaced along cable 504 are signal amplifiers 506. The amplifiers are grouped into subnetworks each of which is provided with one standby power supply 10. Each standby power supply is connected to utility company's power line 508 and thereby receives power during normal mode operation from power plant 510. In practice the television cable line is most often supported by the same structure as supports the power line, but they have been separately illustrated here. This power is stepped down within the standby power supply and is fed to the signal amplifiers within the subnetwork associated with that standby power supply.

A power failure at 508A does not disrupt electrical service to house 512 but, in the absence of a battery operated standby power supply, television set 514 becomes inoperative because the signal has dissipated before reaching house 512. However power supply 10 does operate off its battery and thereby does power amplifiers 506 and thus the signal is able to reach television set 514.

The present invention relates to improvements in standby power supplies and provides a cycle charged system that, upon power failure, dependably, efficiently and safely provides a precisely regulated alternating current to the signal amplifiers.

General Operation

Figure 2:
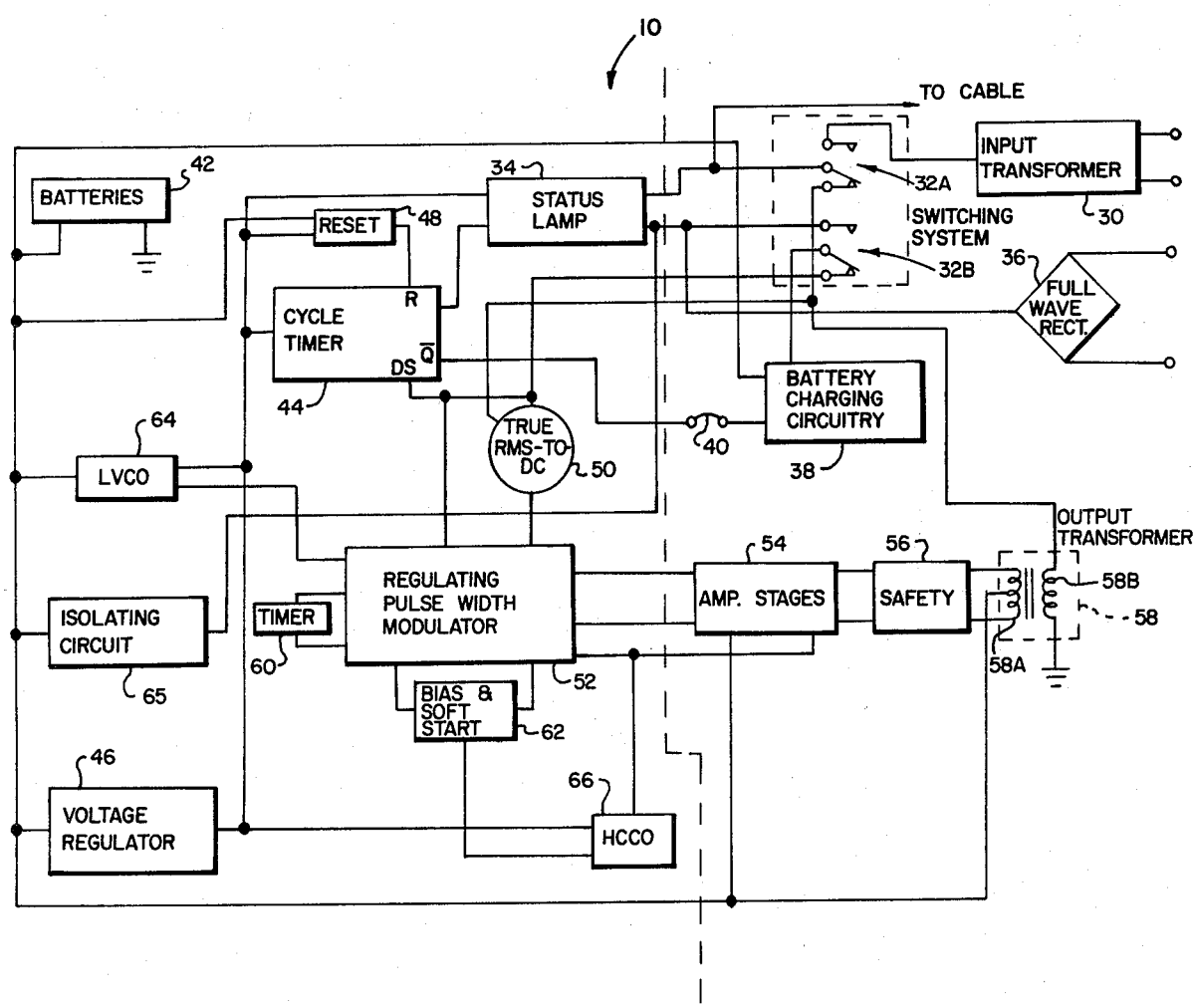
FIG. 2 is a schematic of the circuitry of a standby power supply constructed in accordance with the present invention.

FIG. 2 is a schematic of a cycle charge standby power supply constructed in accordance with the present invention. The standby power supply is designated generally as 10. When utility company power is present, relay 32A of switching system 32 is positioned to pass power from input transformer 30 directly to the cable for use. In this, the normal mode operation, the throw of relay 32A contacts the upper pole to so connect the cable and input transformer 30. It is also convenient to supply status lamp circuitry 34 with electricity from input transformer 30 during normal mode operation.

Full wave rectifier 36 also uses power from the utility company to provide a D.C. current in the standby power supply. Switch 32B is held in its normal mode position when utility company power is present and, in this position, passes direct current voltage from rectifier 36 to battery charging circuitry 38 and to the control elements of status lamp circuitry 34. This causes the status lamp to be steadily illuminated, thereby indicating that there is no power failure in the power line leading to the the cable at this point. Relay 32B, like 32A, is in the normal mode when the throw is in contact with the upper pole of the illustration.

The preferred embodiment includes link 40 which provides an option between trickle charging and cycle charging and batteries of the standby power supply. When link 40 is open, a trickle charge is constantly passed from the battery charging circuitry to batteries 42, thereby maintaining the batteries at their float voltage. However, when link 40 is closed, batteries 42 are cycle charged as controlled by cycle timing circuitry 44.

Cycle timing circuitry 44 receives controlled reference voltages from voltage regulator 46. The signal from resetting logic 48 is also input to cycle timing circuitry 44 as is the direct set signal which is conveniently taken from the input signal to true rms-to-dc converter circuitry 50. Cycle timing circuitry 44 outputs to battery charging circuit 38 and to the control elements of status lamp circuitry 34.

The cycle timing circuitry generates a signal as a function of time that periodically initiates a charging cycle in battery charging circuitry 38 and the batteries continue to be charged until they are brought to the desired voltage level. Reset logic 48 is connected to batteries 42 and compares their voltage against a reference voltage from voltage regulator 46 to sense that the batteries have been charged to the desired voltage. Sensing this condition, the reset logic signals the cycle timer to stop charging the batteries and to begin timing the period until another charging cycle begins. The outer input to the cycle timing circuitry, the direct set input, receives a signal every time that the standby power supply is switched to failure mode operation and this signal serves to start a charging cycle immediately upon the restoration of utility company power.

It is also preferred to include isolating circuitry 65 to separate batteries 42 from voltage regulator 46 during normal mode operation because this represents the dominant drain upon the batteries at this operational state. Isolating circuitry 65 provides an input to voltage regulator 46 from rectifier 36 when the voltage regulator is isolated from the batteries.

During a power failure, relays 32A and 32B are thrown to the failure mode position at which they are illustrated and standby power system 10 then operates off batteries 42. The batteries discharge through charging circuitry 38, through switch 32B, and through true rms-to-dc converter circuitry 50 to regulating pulse width modulating circuitry (hereinafter cited as regulator chip) 52. Regulator chip 52 generates a pulse width regulated square wave form and delivers the positive and negative pulses of the square wave through separate output lines which are amplified through predriver and driver transistors in amplification stages 54 and through safety provisions 56 to primary coil 58A of output transformer 58. Note too that battery power is directly supplied to the amplification stages and to the primary coil of output transformer 58. Secondary coil 58B of the output transformer leads to the cable through relay 32A and it is also convenient to supply a voltage to status lamp circuitry 34. Feedback is also taken from the secondary coil 58B and is connected to true rms-to-dc converter circuitry 50 which controls the input to regulator chip 52.

The supply voltage to regulator chip 52 is conveniently provided off the input to true rms-to-dc converter circuitry 50 and the output of the true rms-to-dc converter is connected as the major signal input to that regulator chip. Regulator chip 52 is also controlled by timing circuit 60, biasing and soft start provision 62, low voltage cut off (hereinafter LVCO), and high current cut off (hereinafter HCCO) 66. Timing circuit 60 sets the frequency of the square wave output and sets this frequency independent of the pulse width of the output which increases as the batteries drain. However the voltage (true rms) of the output remains constant because the increase of the pulse width is controlled to follow the decrease of the peak voltage of the output. Thus the output of the battery powered standby power supply is a constant frequency, constant voltage (true rms) alternating current that is compatible with currently used amplifiers that use sinusoidal current stepped down from the utility company's power when it is available.

The biasing components of biasing and soft start provisions 62 are necessary for the function of the regulator chip as described above and the soft start provision gives a soft turn on at the inception of failure mode operation.

Should the power failure continue for an extended period, the system is shut off by the LVCO before the batteries have been drained either to a point which damages their ability to recharge or to a point after which an acceptable wave form can no longer be produced. The LVCO compares the voltage off batteries 42 with a reference voltage from voltage regulator 46 to sense the cut off point. During the vast majority of power failures the utility company's lines become operative long before properly selected batteries of a standby power system are fully drained, but LVCO 64 prevents damage to the system in instances of particularly extended power failures. Further, regulator chip 52 provides an efficient method of converting the D.C. output of the batteries to an alternating current, thereby provide for an extended operation time of batteries 42.

An additional safety margin is provided to the system by HCCO 66. HCCO 66 shuts off the standby power supply should too great a current be detected in the power supply amplification. The HCCO system supplements the shut off provision of the feedback from amplification stages 54 which is sent directly to regulator chip 52. These additional provisions are beneficial in that the feedback discussed above does not effectively cut off the signal generation in severe over current conditions that effectively short out the output. Safety circuitry 56 further protects the standby power system by regulating the potential between the positive and negative pulses at the primary coil of output transformer.

Status lamp circuitry 34 is provided a supply voltage off the output to the cable from coil 58B when the standby power supply is under battery operation. The status lamp circuitry then indicates that the standby power supply is operating in the failure mode with a blinking light that is controlled by an input from cycle timing circuitry 44.

When the power failure is over and power is restored, relays 32A and 32B are rethrown and held in the position to operate the amplifiers and to immediately start recharging the batteries off of utility company power.

Figure 3:
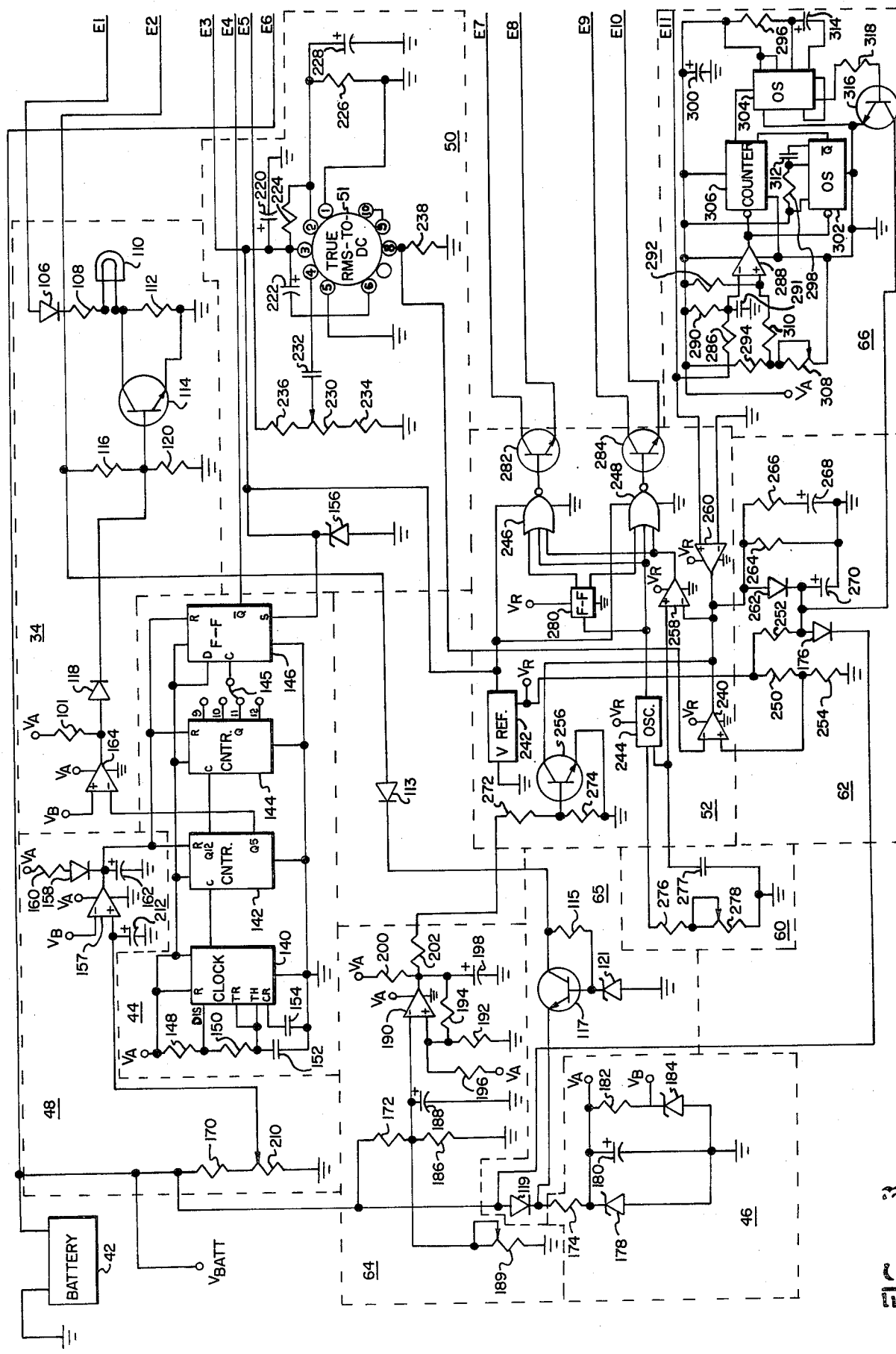
FIG. 3 is a portion of the circuit diagram of a standby power supply constructed in accordance with the present invention.

FIGS. 3 and 4 comprise a single circuit diagram of a specific embodiment of a standby power supply constructed in accordance with the present invention. These drawings are referenced to one another through points E1 through E11 and have been divided along the vertical dotted line of FIG. 2.

The Circuit

Coil 102 is connected to receive power from the public utility lines through leads 100E and 100F and uses the presence or absence of this power to manipulate double pole, single throw relays or switches 32A and 32B. It is also convenient to place standard power outlet 104 parallel to coil 102. Outlet 104 is also connected to ground or common. The terms ground and common are used interchangably throughout this application because the common is grounded to earth.

Ferroresonant transformer 30 in FIG. 4 is connected to public utility power at terminals 100A and 100B. One output of input transformer 30 is connected to the first pole of relay 32A. The throw of relay 32A is connected to the cable through current meter 103 and to status lamp circuitry 34 by its connection to the anode of diode 106. The latter connection may be followed from FIG. 4 to FIG. 3 through E1. The cathode of diode 106 is connected to one side of status lamp 110 through resistor 108. The other side of status lamp 110 is connected to the collector of status lamp transistor 114 and one side of resistor 112. The other side of resistor 112 goes to common as does the emitter of npn transistor 114.

Full wave rectifier bridge 36 receives power from the public utility company after it is stepped down through transformer 30. Rectifier 36 is connected to transformer 30 by leads 100C and 100D. Lead 100C is connected to rectifier 36 between the anode of diode 36A and the cathode of diode 36B and lead 100D is connected to the rectifier between the cathode of diode 36C and the anode of diode 36D. The anodes of diodes 36B and 36C are connected to common and the output of rectifier 36 leaves at the convergence of the cathodes of diodes 36A and 36D.

The output of rectifier 36 is connected to the first pole of relay 32B and may be followed through E2 to one side of resistor 116 and to the anode of diode 113. The cathode of diode 113 is connected to one side of resistor 115 and to the collector of npn transistor 117 of FIG. 3.

The other side of resistor 116 is connected to the cathode of blocking diode 118, to common through resistor 120, and to the base of status lamp transistor 114. The anode of diode 118 is connected to the output of comparator 164 and to voltage regulator output $V_A$ through resistor 101.

Transistor 117 is the heart of isolating circuitry 65 and the emitter of transistor 117 is connected to the cathode of diode 119 and to one side of resistor 174. The base of transistor 117 is connected to the other side of resistor 115 and to the cathode of zener diode 21 which runs to common at its anode.

Returning to relay 32B, the second pole of relay 32B is connected to one side of coil 390, the cathode of diode 392, and one side of resistor 223. The other side of coil 390 runs to ground as does the anode of diode 392. Single throw double pole relay 32C is manipulated by coil 390 and is provided as a convenient plan to tap monitoring equipment (not shown) to the standby power system. The throw of relay 32B is connected to the cathode of blocking diode 122, to common through filtering polarized capacitor 124, and as input to current regulating chip 126. A second input to chip 126 is connected to the slide wire of potentiometer 130 and to one side of polarized capacitor 128. One side of potentiometer 130 is connected to common through resistor 132 and the other side of capacitor 128 also runs to common. The other side of potentiometer 130 is connected to one side of resistor 134 and one side of link 40. The other side of resistor 134 is connected to the output of chip 126 and to the anode of diode 136. The cathode of diode 136 is connected to the anode of diode 122 and, as may be followed through E6 to FIG. 3, to the cathode of batteries 42.

The positive side of batteries 42 is also connected to one side of resistors 170 and 172, to the cathode of blocking diode 176, and to the anode of isolating diode 119. The cathode of diode 119 is connected to the emitter of npn transistor 117 and to one side of resistor 174. Further, the batteries are connected to one side of resistor 322 and to primary output coil 58A in FIG. 4 although these connections have been omitted to simplify the drawings. However the connections have been indicated at their place of entry with the designation $V_{BATT}$. This same convention has been adopted for $V_A$, $V_B$ and $V_R$, each of which is discussed below and has been relied upon to prevent unduly cluttered figures. The negative side of batteries 42 goes to common.

Resistor 174 is the input to voltage regulator 46 and its other side is connected to the cathode of zener diode 178 (the anode of which goes to common), to common through polarized capacitor 180, to one side of resistor 182, and to the output designated $V_A$. The other side of resistor 182 is connected to the cathode of zener diode 184, the anode of which goes to common, and to the output designated $V_B$. Outputs $V_A$ and $V_B$ carry regulated reference voltage for which the connections throughout the circuit have been omitted in this circuit diagram for simplicity as discussed above.

The positive side of batteries 42 is connected to LVCO 64 at resistor 172. The other side of resistor 172 is connected to the slide wire of potentiometer 189 which goes to common, to common through resistor 186, to common through filtering polarized capacitor 188, and to the inverting input of LVCO comparator 190 which is powered between $V_A$ and common. The non-inverting input to comparator 190 is connected to common through resistor 192, to one side of feedback resistor 194, and to one side of resistor 196, the other side of which receives output $V_A$. The other side of feedback resistor 194 is connected to common through polarized capacitor 198, to output $V_A$ through resistor 200, to the output of LVCO comparator 190, and to one side of resistor 202. The other side of resistor 202 is connected to regulating pulse width modulator 52 at one side of resistor 272.

Recall that one side of resistor 170 is connected to the positive side of batteries 42. This connection is the input to reset circuitry 48. The other side of resistor 170 is connected to common through potentiometer 210. The slide wire of the potentiometer is connected to common through polarized capacitor 212 and to the non-inverting input of reset comparator 157. Voltage regulator output $V_B$ is the inverting input to comparator 157 which is powered between output $V_A$ and common. The output of reset comparator 157 is connected at the cathode of LED diode 158 (the anode of which is connected to output $V_A$ through resistor 160), to common through polarized capacitor 162, and to cycle timing circuitry 44 as the reset inputs of counter 142, counter 144, and flip-flop 146.

Cycle timing circuitry 44 includes time clock 140, dividing counters 142 and 144, and flip-flop 146. Voltage regulator output $V_A$ enters cycle timing circuitry 44 where it is connected to the reset and supply voltage inputs of clock 140, the supply voltage inputs of counters 142 and 144, the supply voltage and data inputs of flip-flop 146, and to one side of resistor 148.

Clock 140 is a monolithic timing circuit connected to produce timed intervals in a stable operation. In this configuration the other side of resistor 148 is connected to the discharge output of clock 140 and to one side of resistor 150, the other side of the latter being connected to common through capacitor 152 and to the trigger and threshold inputs of clock 140. The control input of clock 140 also goes to common through capacitor 154. The ground output of the clock is, of course, connected to common and the signal output of clock 140 is received as input to counter 142.

Counter 142 is a ripple carry binary counter powered between the supply voltage input and common. The reset input discussed above is the other input to counter 142. This counter uses two outputs, the first of which is connected to status lamp comparator 164 as the inverting input, the second of which is received as the pulse signal input to counter 144.

It is preferred that counter 144 be of similar type and configuration to counter 142 and similarly be connected at its voltage supply input, common, and reset input. However, it is also preferred that counter 144 retain a number of output selections available to link 145 by which the signal output of counter 144 is received as the signal pulse input of flip-flop 146.

Flip-flop 146 is a dual type D toggle flip-flop which is powered between the supply voltage input and common. The other inputs to flip-flop 146 include the data and reset inputs, each discussed above, and the direct set input. The direct set input to flip-flop 146 is connected to the cathode of zener diode 156 and through it to common, to voltage regulator 242 of regulator chip 52, as supply voltage to nor gates 246 and 248 (each of which runs to common), to pin 3 of true rms-to-dc converter 51, to one side of polarized capacitors 220 and 222, to one side of resistor 224, to common through filtering polarized capacitor 221, and to the second pole of relay 32B through resistor 223. The connection to relay 32B may be followed through E3 to FIG. 4. The output of flip-flop 146 is connected to the inverting input of comparator 168 which is powered between the voltage regulator output $V_A$ and common. The other input to comparator 168 is provided by voltage regulator output $V_B$. The output of comparator 168 is connected to the second side of link 40.

A particular model that has been found to operate satisfactorily for true rms-to-dc converter 51 within the described embodiment is AD 536 AJH available from Analog Devices. The pin numbers refered to throughout the application for true rms-to-dc converter 51 apply to this model and different connections and peripheral equipment must be considered if a different model is used even though the model chosen is equivalent within the scope of the present invention.

Describing the model, true rms-to-dc converter 51 is connected at pin 2 to the other side of resistor 224, to common through resistor 226, and to common through polarized capacitor 228. Further, the other side of capacitor 222 is connected at pin 6, rms-to-dc converter 51 runs to common at both pin 1 and 5, and pin 10 and pin 9 are connected together. Pin 4 is connected to the slide wire of potentiometer 230 through capacitor 232. One side of potentiometer 230 goes to common through resistor 234 and the other side is connected through resistor 236 to the second pole of relay 32A and to the secondary winding 58B of output transformer 58. Finally, pin 8 of rms-to-dc converter 51 is connected to common through resistor 238 and to the inverting input of comparator 240 of regulator chip 52.

The major active components that are conveniently available on regulator chip 52 are individually illustrated in FIG. 3. Regulator chip 52 is a regulating pulse width modulator of a configuration to receive inputs from true rms-to-dc converter circuitry 50, from batteries 42 discharging through battery charging circuit 38, LVCO 64, HCCO 66, R-C timing circuit 60, and soft start provisions 62.

The input to regulator chip 52 at voltage regulator 242 was discussed above. Voltage regulator 242 operates between this supply voltage, $V_R$, and common to generate a reference voltage output for oscillator 244; for supply voltage for comparator 240, comparator 258, comparator 260, and flip-flop 280; and for biasing and soft start circuitry 62 as it is connected between one end of resistor 250 and one end of resistor 252. The other end of resistor 250 is connected to common through resistor 254 and to regulator chip 52 at comparator 240 as the non-inverting input.

The output of comparator 240 is connected to the collector of npn transistor 256 which goes to common at its emitter, to comparator 258 as the inverting input to which the output of comparator 260 is also connected, and to biasing and soft start circuitry 62 at the anode of diode 262, to common through resistor 264, and to common through resistor 266 and polarized capacitor 268 following in series.

Continuing in biasing and soft start circuitry 62, the cathode of diode 262 is connected to common through polarized capacitor 270, to the anode of diode 176, and to the other side of resistor 252 discussed previously.

Another input to regulator chip 52 comes from LVCO 64 and is connected at resistor 272. The other side of resistor 272 is connected to the base of transistor 256 and to common through resistor 274.

Timing circuit 60 is connected to oscillator 244 at one side of resistor 276 and the other side of resistor 276 is connected to the slide wire of potentiometer 278 which runs to common. Capacitor 277 of the R-C timing circuit runs to common and is connected to the regulator chip at the non-inverting input of comparator 258 as well as to oscillator 244.

The output signal of oscillator 244 is connected to the input of flip flop 280 and to inputs to nor gates 246 and 248.

In addition, nor gates 246 and 248 receive the output of comparator 258 as another input and nor gate 246 receives as a third input the positive output signal from flip-flop 280 and nor gate 248 receives the negative output signal from flip-flop 280 as an input. Nor gates 246 and 248 are connected to the base of npn transistors 282 and 284, respectively.

The final input to regulator chip 52 is the connection of the non-inverting input of comparator 260 to resistor 286 of HCCO 66 and resistors 352 and 358. See FIG. 4.

Returning to FIG. 3, the other side of resistor 286 in HCCO 66 is connected to the inverting input of comparator 288, to one side of resistor 290, and to common through capacitor 291. The other side of resistor 290 is connected to to voltage regulator output $V_A$; to one side of resistors 292, 294, 296 and 298; to common through polarized capacitor 300; to the supply voltage input of comparator 288; to the clock input of resettable falling edge one shot 302; to the supply voltage input of binary counter 306, and to supply voltage and clock inputs of non-resettable rising edge one shot 304. The other side of resistor 294 is connected to the slide wire of potentiometer 308 which goes to common on its other side, and to one side of resistor 310. The other side of resistor 310 is connected to the other side of resistor 292 and the non-inverting input of comparator 288. The output of comparator 288 is inverted as an input signal counter 306 and is also inverted as input to one shot 302. Other connections to counter 306 include its connection to common, the reset input which is connected to the inverted output of one shot 302 and the output of the counter which is connected as input to one shot 304. Additional connections of one shot 302 include its connection to common, the connection of the timing input to the other side of resistor 298 and to one side of capacitor 312, and the connection of capacitor 312 to a convenient common through one shot 302. Further connections of one shot 304 include its connection to ground, the connections of the timing input to the other side of resistor 296 and to one side of polarized capacitor 314, the connection of the other side of capacitor 314 conveniently to common through one shot 304, the connection of the inverted output as the retrigger input, and the connection of the non-inverted output to the base of npn transistor 316 through resistor 318. The emitter of transistor 316 runs to common and the collector of transistor 316 is connected to biasing and soft start circuitry 62 as discussed above.

The output of regulator chip 52 is connected to the amplifier stages 54 through transistors 282 and 284. The collectors of transistors 282 and 284 are connected to each other and to common through polarized capacitor 320 and to the positive side of batteries 42 through resistor 322 as indicated by $V_{BATT}$. These connections may be followed from FIG. 3 to FIG. 4 through E7 and E9.

The emitter of transistor 282 is connected to one side of resistor 324. The other side of resistor 324 is connected to the base of npn transistor 326 and to common through resistor 328. The collector of transistor 326 is connected to one side of resistor 330, the other side of which is connected to the base of pnp transistor 332, and to one side of resistor 334. The emitter of transistor 326 runs to ground. The emitter of transistor 332 is connected to the other side of resistor 334 and to the feedback of primary coil 58A of in transformer 58. The collector of transistor 332 is connected to one end of resistor 336, the other end of which is connected to common through resistor 338, to the base of npn transistor 340 and to the collector of transistor 340 through metal oxide veristor (hereinafter MOV) 342. The collector of transistor 340 is also connected to the cathode of diode 344, one side of MOV 346, one side of resistor 348, and to primary coil 58A. The emitter of transistor 340 is connected to one side of resistor 352, to common through resistors 354 and 556 and to the emitter of transistor 372. The other side of resistor 352 is connected to common through resistor 358 and to HCCO 66 and to regulator chip 52 as may be followed to FIG. 3 through E11.

The emitter of transistor 284 is connected to resistor 360 and through resistor 360 to the base of npn transistor 362 and to common through resistor 364. The collector of transistor 362 is connected to one side of resistor 366. The other side of resistor 366 is connected to the base of pnp transistor 368, and through resistor 370, to both the emitter of transistor 368 and to the feedback from primary coil 58A. The collector of transistor 368 is connected through resistor 374 to the base of npn transistor 372, to common through resistor 376, and to one side of MOV 378. The collector of transistor 372 is connected to the cathode of diode 380, to common through MOV 382 and to one side of capacitor 384 and to primary coil 58A. Further connections in safety provisions 56 include running the other side of MOV 346 and the anodes of diodes 344 and 380 to ground and the connection of the other side of capacitor 384 to the other side of resistor 348.

Transformer 58 receives an input to primary coil 58A from batteries 42. Secondary coil 58B of output transformer 58 runs to ground on one side and is connected to the second pole of relay 32A and to one side of resistor 236.

Model numbers and manufacturers are tabulated below for various components that have been found to operate effectively within this particular embodiment. The listed components, in combination with appropriately selected additional components, are intended to merely illustrate one embodiment of the present invention and should in no way be read to limit the invention. Further, the illustrated peripherial connections are appropriate for these parts but modifications must be considered when different although equivalent components are used.

| Component | Part Designation | Manufacturer |
| --- | --- | --- |
| true rms-to dc counter 51 | AD 536 AJH | Analog Devices |
| regulator chip 52 | SG 3524 | Texas Instruments |
| coil 102 | KIK 30-661 | National Controls |
| current regulating chip 126 | LM 350 | National Semiconductor |
| clock 140 | NE 555 | Texas Instruments |
| counter 142 | MC 14040B | Motorola |
| counter 144 | MC 14040B | Motorola |
| Flip-flop 146 | MCC 14012B | Motorola |
| comparator 288 | LM 3900 | National Semiconductor |
| one shot 302 and shot 304 | MC 145388 | Motorola |
| counter 306 | MC 14040B | Motorola |

It is thus believed that the construction of the present invention will be apparent from the foregoing drawings and description and attention then turns to further describing the operation of the present invention.

SUMMARY OF NORMAL MODE OPERATION

Standby power supply 10 functions in the normal mode operation when utility company power is provided to transformer 30. One output of transformer 30 energizes coil 102 which preferably includes time delay elements well known in the art and ommitted from these drawings. Energized, coil 102 throws relays 32A and 32B to the poles previously designated as the first poles. These are illustrated as the upper poles in FIG. 4. Thus, the throw of relay 32A contacts the first pole of that relay and thereby connects an output of transformer 30 with the cable.

Transformer 30 also supplies a stepped down voltage to full wave rectifier bridge 36 which, during normal mode operation, delivers its output through relay 32B to battery charging circuitry 38. This input is filtered with capacitor 124 and enters current regulating chip 126, the peak voltage of which is adjustable with potentiometer 130 in the R-C circuit of resistor 132 and capacitor 128. The output of the current regulating chip may be followed through E6 to its input at the positive side of battery 42. Whether the battery charging circuitry is operating on a cycle or on a trickle charge is determined by the position of link 40 through which the battery charging circuitry is connected to cycle timing circuitry 44. Closing link 40 connects the output of comparator 168 with current regulating chip 126. Comparator 168 compares the output of cycle timing circuitry 44 with voltage regulator output $V_B$ and sends out a signal that causes current regulating chip 126 to start a charging cycle when the output of cycle timing circuitry 44 is sensed. Further, this charging cycle will continue until the output signal from the cycle timing circuitry is terminated.

The cycle timing circuitry includes clock 140, counters 142 and 144, flip-flop 146 and associated connections as discussed above. Clock 140 emits timed pulses which are received in counter 142. After receiving a given number of pulses from clock 140, counter 142 sends a pulse to counter 144 which similarly counts the number of pulses and after receiving a full count, sends a pulse to the clock input of flip-flop 146. In the preferred embodiment, counter 144 has various outputs available to flip-flop 146. Each of these represents a different timing function which must be received before signaling the flip-flop and adjustable link 145 is thus used to set the length of the period between charging cycles during normal operation.

After receiving the pulse input, flip-flop 146 passes the voltage regulator output presented at its data input to comparator 288 and continues doing so until a signal is received at the reset input of the flip-flop. Consequently, the batteries are charged until this reset input is received.

The battery voltage at which the charging cycle is completed is set by potentiometer 210 of reset circuitry 48 and it is preferred that LED diode 158 be included to aid in setting the potentiometer at the desired voltage level. The potentiometer receives the voltage from the batteries and compares this with a reference voltage in comparator 157. When the desired voltage level has been attained, comparator 157 sends out a signal that clears the count on counters 142, and 144 (thereby starting another count toward a charging cycle) and which resets flip-flop 146 and thereby terminates the output from the flip-flop. This in turn shuts off comparator 168 and thereby shuts down the battery charging circuitry and ends that charging cycle.

Isolation circuitry 65 is useful to limit the drain on the batteries between charging cycles during normal operation. Direct current from rectifier 36 passes to the cathode of diode 119 through the collector and emitter of transistor 117. Resistor 115 connects the input at the collector of the transistor with its base to activate the transistor when the input from the rectifier is present.

The voltage output of transistor 117, under these conditions, exceeds the battery voltage and thereby reverse biases diode 119 to prevent input from batteries 42 to the zener diodes of voltage regulator 46. The output of transistor 117 must supply voltage regulator 46 during normal mode operation. However, rectifier 36 supplies no voltage during failure mode operation and the batteries are required to supply the voltage regulator and, under these circumstances, find negligable impedance from diode 119.

The preferred embodiment also features outlet 104 powered off transformer 30. This outlet is included to allow installation of a heating element (not shown) in order to maintain the batteries at an effective operating temperature during the winter months of colder climates.

Summing of Failure Mode Operation

During a power failure coil 102 deactivates and relays 32A and 32B throw to the positions illustrated. The batteries are then discharged through diode 122 to relay 32B. The output is thereafter delivered to true rms-to-dc converter 51 which delivers a controlled D.C. output as the input to regulating pulse width modulator 52. This input is compared with a reference voltage in comparator 240, the output of which becomes an input to comparator 258. The output of comparator 258 is received as an input to nor gate 246 and 248. It is this battery of comparators, including comparator 260 which results in the pulse width modulation of regulator chip 52.

Batteries 42 also provide the voltage supply for regulator chip 52 either directly or through voltage regulator 242 and thereby provide operating power throughout the chip. One of the elements so supplied is oscillator 244.

Oscillator 244 is controlled by R-C timing circuitry 60 which sets the frequency of the oscillator and ultimately of the battery powered standby power supply.

The frequency of the oscillator is set at twice the desired frequency of the standby power supply output. Flip-flop 280 is driven by oscillator 244 and halves the frequency of the oscillator sending the inverted output of the flip-flop to one of the nor gates as an input and the non-inverting output to the other nor gate as an input. It is the operation of this flip-flop which generates the square wave output. In addition, each of the nor gates receives the output of the oscillator itself as an input and the spike output of the oscillator serves to blank the output of the regulator chip during transistion to ensure that output transistor 282 and 284 are never on at the same time. The output of nor gates 246 and 248 send signals alternatively to the bases of transistors 282 and 284, respectively.

When the base of either output transistor 282 or 284 receives a signal, then that transistor is activated and operates upon an output from the batteries which enter these transistors at their respective collectors. The emitters of transistors 282 and 284 are connected to pre-driver transistors 326 and 362, respectively, the collectors of which are connected to transistors 332 and 368, respectively. The emitters of these transistors receives feedback from primary coil 58B of output transformer 58 and the collectors of these, transistors 332 and 368, are connected to the bases of major amplifying transistors 350 and 372. The collectors of the major amplifying transistors are connected to primary coil 58A of transformer which also receives an output from the batteries. The secondary coil of output transformer 58 is connected to the cable through the relay 32A. Note also the feedback line from secondary coil 58B to true rms-to-dc converter 51.

Transistors 350 and 372 are individually protected by MOV 342 and MOV 378, respectively, which are connected from the base to the collector of each. In addition, their bases are connected to common through resistors 338 and 376, respectively.

In addition, provisions are present to control the potential between the leads of primary coil 58A. These provisions include the R-C circuit of resistor 348 and capacitor 384, the connection of MOV 346 and MOV 382 between the respective leads and common, and the connection of diode 344 and 380 between the respective leads and common.

Further, shut down equipment is connected to the amplifier stages at the emitters of transistors 350 and 372. These shut off provisions receive the signal from the amplifier stage at comparator 260 and resistor 286. In this connection, comparator 260 regulates the waveform to minimize the pulse width during over current situations. However, these provisions are inadequate in severe overcurrent situations. High current cut off 66 is provided to handle these situations.

Resistor 286 receives the same input to high current cut off 66 that comparator 260 receives from amplifier stages 54. Here this input, as modified, is compared with a reference voltage, and if high, comparator 288 sends a signal to counter 306 and to one shot 302. Counter 306, one shot 302 and one shot 304 are interconnected and provided with appropriate periphial circuitry to establish a cyclical shut down in the presence of a current overload in the amplifier stage. These elements provide a brief time delay before shut down to avoid shutting down for normal start up transients. However, when the over current persists beyond this brief period, transistor 316 is activated and brings the inverting input of comparator 258 to ground. This totally shuts off the output of regulator chip 52 and thereby shuts off standby power system 10 for the duration of the HCCO timed cycle. At the end of the cycle one shot 304 stops its output to transistor 316 and regulator chip 52 is allowed to generate an output. The output is again sensed at the amplifier stages and when an over current condition exists beyond the time delay, HCCO initiates a similar shut down cycle and so on. The duration of the time delay is brief enough not to endanger the components of the system and the length of a shut off cycle long enough to allow recovery and prevent damage, yet short enough not to inconvenience television viewers for any significantly longer period than the duration of the over current condition itself.

Similarly, transistor 256 drops the inverting input of comparator 258 to ground when the voltage output of the batteries falls too low. The low voltage cut off is necessary to prevent operation of the standby power supply beyond the point at which the system can no longer present an acceptable output or beyond which the rechargability of the batteries is endangered. The desired voltage level for LVCO operation is set by potentiometer 189 and controlled by the operation of comparator 190. When the voltage level of the batteries drops too low, comparator 190 activates and applies a sufficient voltage at the base of transistor 256 to activate it and to thereby ground the inverting input to comparator 258 through the collector and emitter of that transistor.

Mode Indication

It is also preferred that some readily perceptible indication of the operational mode be included in the standby power supply and two such provisions are included in the described embodiment. The first provision is status lamp circuitry 34 which emits a blinking light when the standby power supply is operating off batteries and a steady light when operating with utility company power.

Status lamp circuitry 34 is powered through diode 106 which is connected to the throw of 32A. Thus power from transformer 30 is present when utility company power is present and power from the batteries is present during failure mode operation. The blinking effect of failure mode operation is controlled by the alternate activation and deactivation of transistor 114. Counter 142 sends a continuous succession of pulsing signals that activate comparator 164 to send a signasl to the base of transistor 114 thereby activating it and effectively shorting out resistor 112. However, when utility power is present, rectifier 36 delivers a steady voltage through resistor 116 which overides the lapses between the pulses and keeps status lamp 110 emitting a steady light.

The second provision for monitoring the status of the standby power supply involves relay 32C. Relay 32C is controlled by the position of relay 32B through coil 390 and the position of relay 32B is dependent upon the operating mode of the standby power supply. Thus relay 32C is a convenient position for interfacing well known conventional monitoring equipment that is useful within central monitoring stations.

We claim:

1. A standby power supply for supplying power to a cable from an a-c utility source when available, and for supplying substantially constant frequency a-c power from a float service battery powered circuit to said cable when said utility source is unavailable, comprising:

means for converting the utility supplied voltage to cable voltage and for normally applying said converted voltage to said cable;

means for connecting said battery powered circuit to said cable upon failure of said utility source, and for reapplying said utility source to said cable upon restoration of said utility source;

a battery converting circuit converting the battery voltage to a-c voltage of substantially the same frequency as said utility source for application to said cable, said battery converting circuit comprising:

means for measuring a voltage applied to said cable by said battery converting circuit;

means for generating pulses of substantially constant frequency and of variable width, responsive to said voltage measuring means to vary the width of said pulses to maintain the voltage applied to said cable by said battery converting circuit substantially constant, despite decay in the battery voltage and despite varying loads applied to the standby power supply;

an amplifier controlled by said pulse generating means for amplifying said pulses to the voltage desired for application to said cable by said battery converting circuit;

means for charging said battery, including:

rectifying means for producing a d-c charging current from said a-c utility source;

means for measuring a desired time interval between charging cycles of said battery;

means responsive to said time measuring means for applying the charging current to said battery upon the elapsing of said time interval;

means responsive to a discharge condition of said battery for applying the charging current to said battery when said discharge condition falls below a predetermined level;

and means responsive to battery use for applying the charging current to said battery after said battery has been used to supply power to said cable;

means responsive to the voltage on said battery for removing said charging current from said battery when said voltage reaches a desired level; and means responsive to said charging current removing means for resetting said clock means to initiate a succeeding desired time interval measurement.

2. A standby power supply in accordance with claim 1 in which said voltage measuring means is responsive to the true rms voltage applied to said cable by said battery converting circuit.

3. A standby power supply in accordance with claim 1 further comprising means for detecting an objectionably large current in said amplifier and for reducing the pulse width of the output upon detection of said objectionably large current.

4. A standby power supply system in accordance with claim 1 further including a high-current cut-off circuit comprising means for detecting an objectionably large current in said amplifier and for shutting down said pulse generating means on a cyclical basis upon detection of said objectionably large current; whereby said cut-off circuit activates only after the presence of an objectionably high current is detected throughout a brief delay period, and once activated, shuts off said pulse generating means for a relatively longer timed period, then deactivates and begins another cycle with the operation of said detecting means.

5. A standby power supply system in accordance with claim 1 further comprising means for gradually increasing the amplitude of the pulses generated by said pulse generating means upon start-up thereof until a desired amplitude is reached.

6. A standby power supply system in accordance with claim 1 further comprising a low-voltage cut-off means for detecting a minimum allowable peak voltage output of said battery and means for shutting down said pulse generating means upon detection of said minimum allowable peak voltage output.

7. A standby power supply for supplying power to a cable from an a-c utility source when available, and for supplying substantially constant frequency a-c power from a float service battery powered circuit when said utility source is unavailable, said standby power supply comprising:

means for converting the utility supplied voltage to cable voltage and for applying said converted voltage to said cable;

means operative upon failure of utility power for connecting said battery circuit to said cable, and operative upon restoration of utility power to disconnect said battery powered circuit from said cable and to reapply said converted voltage to said cable;

said battery powered circuit including means for converting battery voltage to a-c voltage of substantially the same frequency as said utility source for application to said cable; and means for charging said battery comprising:

rectifying means for converting utility supplied alternating current to a d-c charging current;

clock means for measuring a desired time interval between charging cycles of said battery;

means responsive to said clock means for applying the charging current from said rectifying means to said battery upon the elapsing of said time interval;

means responsive to a discharge condition of said battery for applying the charging current to said battery when said discharge condition falls below a predetermined level;

means responsive to battery use for applying the charging current to said battery after said battery has been used to supply power to said cable;

means responsive to the voltage on said battery for removing said charging current from said battery when said voltage reaches a desired level; and means responsive to said charging current removing means for resetting said clock means to measure a succeeding desired time interval.

8. A standy power system in accordance with claim 7 further including status lamp circuitry comprising:

a status lamp;

means for receiving a pulsing signal from said clock means;

means responsive to said pulsing signal for controlling the illumination of said status lamp, whereby said status lamp blinks during the failure of utility power; and means to override said means responsive to said pulsing signal in the presence of utility power, whereby said status lamp is caused to steadily illuminate as in indication of the presence of utility power.

9. A standby power supply system in accordance with claim 7 including means for isolating the battery from major load elements within said circuit means interposed between said battery and said cable when utility power is present and said battery is removed from said charging current.

10. A standby power supply for supplying power to a cable from an a-c utility source when available, and for supplying substantially constant frequency alternating current power output from a float service battery when said utility source is unavailable, said standby power supply comprising:

means for converting utility supplied voltage to cable voltage and for delivering said converted voltage to said cable;

means operative upon failure of utility power for connecting said battery circuit to said cable, and operative upon restoration of utility power to disconnect said battery circuit from said cable;

said battery powered circuit including means for converting battery voltage to a-c voltage of substantially the same frequency as that of said utility source for application to said cable;

said battery powered circuit comprising means for measuring a voltage applied to said cable;

means for generating pulses of substantially constant frequency and variable time width, said pulse generating means being responsive to said voltage measuring means to vary the width of said pulses to maintain the voltage applied to said cable substantially constant, despite decay in the battery voltage and despite varying loads applied to the standby power supply;

an amplifier for amplifying said pulses to the voltage desired for application to said cable;

means for charging said battery comprising:

rectifying means for converting utility supplied a-c current to a d-c charging current;

clock means for measuring a desire time interval between charging cycles of said battery;

means responsive to said clock means for applying the charging current from said rectifying means to said battery upon the elapsing of said time interval;

means responsive to a discharge condition of said battery for applying the charging current to said battery when said discharge condition falls below a predetermined level;

and means responsive to battery use for applying the charging current to said battery after said battery has been used to supply power to said cable;

means responsive to the voltage on said battery for removing said charging current from said battery when said voltage reaches a desired level; and means responsive to said charging current removing means for resetting said clock means to measure a succeeding desired time interval.

11. A standby power supply in accordance with claim 10 in which said voltage measuring means is responsive to the true rms voltage applied to said cable by said battery converting circuit.

12. A standby power supply in accordance with claim 10 further comprising means for detecting an objectionably large current in said amplifier and for reducing the pulse width of the output upon detection of said objectionably large current.

13. A standby power supply in accordance with claim 10 further comprising a high-current cut-off means for detecting an objectionably large current in said amplifier and for shutting down said pulse generating means on a cyclical basis upon detection of said objectionably large current; whereby said shut down means activates only after the presence of an objectionably high current is detected throughout a brief delay period and, once activated, shuts off said pulse generating means for a relatively longer timed period, then deactivates and begins another cycle with the operation of said detection means.

14. A standby power supply in accordance with claim 10 further comprising means for gradually increasing the amplitude of the pulses generated by said pulse generating means upon start-up thereof until a desired amplitude is reached.

15. A standby power supply system in accordance with claim 10 further comprising a low-voltage cut-off means for detecting the minimum allowable peak voltage output of said battery and means for shutting down said pulse generating means upon detection of said minimum allowable peak voltage output.

16. A standby power supply system in accordance with claim 10 further including status lamp circuitry comprising:

a status lamp;

means for receiving a pulsing signal from said clock means;

means responsive to said pulsing signal for controlling the illumination of said status lamp, whereby said status lamp flashes during the failure of utility power; and means to override said means responsive to said pulsing signal in the presence of utility power, whereby said status lamp is caused to steadily illuminate as an indication of the presence of utility power.

17. A standby power supply system in accordance with claim 6 including means for isolating the battery from major load elements within said circuit means, interposed between said battery and said cable when utility power is present and said battery is removed from said charging current.

* * * * *